US011249342B2

(12) United States Patent
Mochida et al.

(10) Patent No.: US 11,249,342 B2
(45) Date of Patent: Feb. 15, 2022

(54) LIGHT EMITTING DEVICE, SURFACE LIGHT SOURCE DEVICE AND DISPLAY DEVICE

(71) Applicant: Enplas Corporation, Saitama (JP)

(72) Inventors: Toshihiko Mochida, Saitama (JP); Hiroaki Okuyama, Saitama (JP)

(73) Assignee: Enplas Corporation, Saitama (JP)

( * ) Notice: Subject to any disclaimer, the term of this patent is extended or adjusted under 35 U.S.C. 154(b) by 184 days.

(21) Appl. No.: 16/644,512

(22) PCT Filed: Sep. 5, 2018

(86) PCT No.: PCT/JP2018/032803
§ 371 (c)(1),
(2) Date: Mar. 5, 2020

(87) PCT Pub. No.: WO2019/049871
PCT Pub. Date: Mar. 14, 2019

(65) Prior Publication Data
US 2021/0397048 A1 Dec. 23, 2021

(30) Foreign Application Priority Data

Sep. 6, 2017 (JP) .............................. JP2017-171496

(51) Int. Cl.
G02F 1/13357 (2006.01)
F21V 5/04 (2006.01)
G02B 3/04 (2006.01)

(52) U.S. Cl.
CPC ........ G02F 1/133606 (2013.01); F21V 5/045 (2013.01); F21V 5/046 (2013.01); G02B 3/04 (2013.01)

(58) Field of Classification Search
CPC ...... G02F 1/133606; F21V 5/04; F21V 5/045; F21V 5/046
See application file for complete search history.

(56) References Cited

U.S. PATENT DOCUMENTS 9,484,510 B2 * 11/2016 Kim ........................ H01L 33/50
9,719,656 B2 * 8/2017 Lin ..................... G02B 19/0061
(Continued)

FOREIGN PATENT DOCUMENTS

JP 2009-043628 2/2009
WO WO 2019/049871 3/2019

OTHER PUBLICATIONS

International Search Report and the Written Opinion dated Nov. 20, 2020 From the International Searching Authority Re. Application No. PCT/JP2018/032803 and Its Translation of Search Report Into English. (9 Pages).

Primary Examiner — Jong-Suk (James) Lee
Assistant Examiner — Eric T Eide

(57) ABSTRACT

This light emitting device includes a light emitting element and a light flux controlling member. The light flux controlling member includes an incident surface, an emission surface, a back surface, a protruding portion and a scattering portion. In a cross section including a central axis, an angle formed by two beams, which are emitted from the light emitting device and have a maximum luminous intensity, is 150° or more. In a cross section including a central axis, predetermined light is made incident at an incident angle of 60° and an average angle, which is formed by, among the light reflected by the scattering portion, a light ray having a maximum light amount and a light ray having a light amount of 50% of the maximum light amount, is 5° or more.

12 Claims, 11 Drawing Sheets

(56) References Cited

U.S. PATENT DOCUMENTS

| | | | |
|---|---|---|---|
| 11,067,248 B1* | 7/2021 | Lee | G02B 19/0061 |
| 2009/0052192 A1* | 2/2009 | Kokubo | F21V 5/048 |
| | | | 362/311.09 |
| 2010/0135028 A1 | 6/2010 | Kokubo | |
| 2014/0117394 A1* | 5/2014 | Kim | F21V 17/06 |
| | | | 257/98 |
| 2015/0260371 A1* | 9/2015 | Takatori | G02B 19/0047 |
| | | | 362/97.1 |
| 2017/0074482 A1* | 3/2017 | Lin | G02B 19/0014 |

* cited by examiner

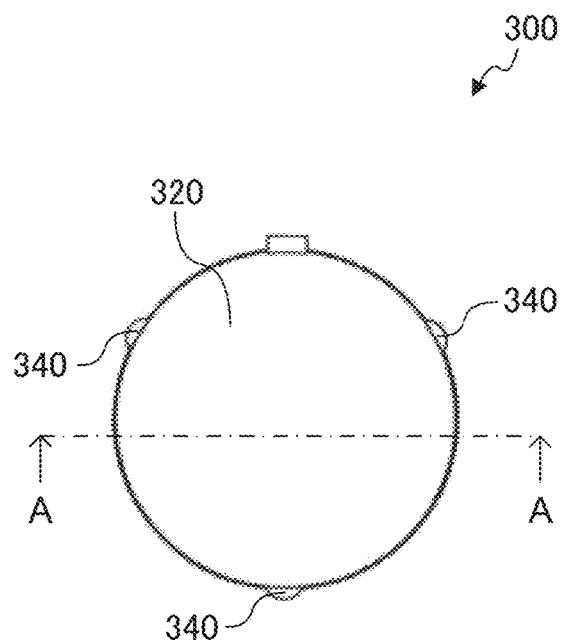
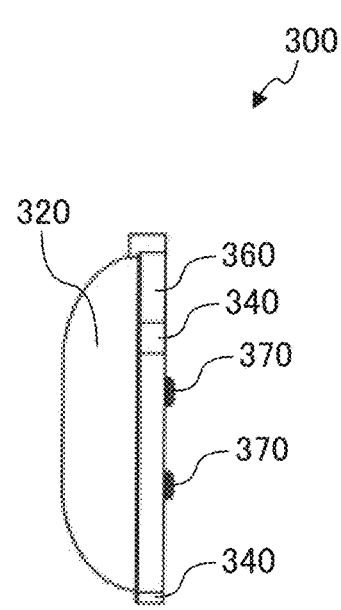
FIG. 4A
FIG. 4B
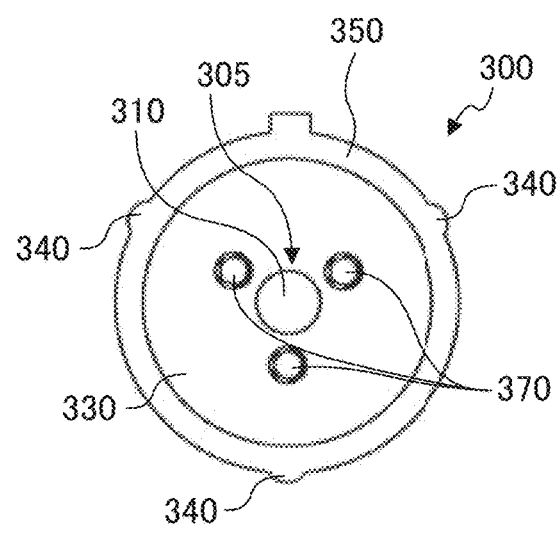
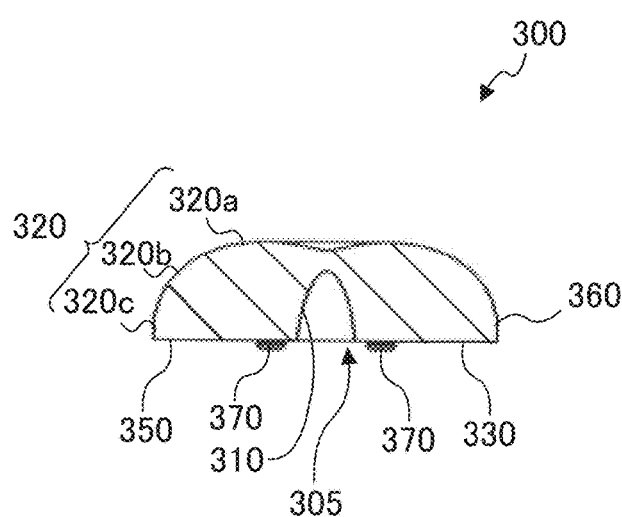
FIG. 4C
FIG. 4D

LIGHT EMITTING DEVICE, SURFACE LIGHT SOURCE DEVICE AND DISPLAY DEVICE

TECHNICAL FIELD

The present invention relates to a light-emitting device, a surface light source device and a display device.

BACKGROUND ART

Some transmitting image display apparatuses such as liquid crystal display apparatuses use a direct surface light source device as a backlight. In recent years, direct surface light source devices including a plurality of light-emitting elements as the light source have been used.

For example, a direct surface light source device includes a substrate, a plurality of light-emitting devices including a plurality of light-emitting elements and a plurality of light flux controlling members (lens), and a light diffusion member. The light-emitting element is, for example, a light-emitting diode (LED) such as a white light-emitting diode. The plurality of light-emitting devices are disposed in a matrix on the substrate. The light flux controlling member that expands light emitted from each light-emitting element in the planar direction of the substrate is disposed over each light-emitting element fixed to the substrate. The light emitted from light-emitting device is diffused by the light diffusion member, and is applied to an illumination target member (e.g., a liquid crystal panel) in a planar fashion (see, e.g., PTL 1).

PTL 1 discloses a light-emitting device including a light flux controlling member including a light-emitting element, an incidence surface, a rear surface and an emission surface. The incidence surface is an inner surface of a recess that is formed opposite a light-emitting element in the rear surface, and the incidence surface allows incidence of light emitted from the light-emitting element. The rear surface extends radially outward from the opening edge of the recess. The emission surface is disposed on the side opposite the incidence surface, and emits the light entered from the incidence surface.

The light emitted from the light-emitting element enters the light flux controlling member from the incidence surface. The light having entered the light flux controlling member reaches the emission surface. The majority of the light having reached the emission surface is emitted to the outside from the emission surface. At this time, the light emitted from the emission surface is refracted and emitted by the emission surface in such a manner as to be expanded with respect to the optical axis of the light-emitting element. In addition, another part of the light incident on the emission surface is internally reflected by the light emission surface, and then again internally reflected by the rear surface so as to be emitted from the outer edge of the emission surface to the outside of the light flux controlling member.

CITATION LIST

Patent Literature
PTL 1
Japanese Patent Application Laid-Open No. 2009-043628

SUMMARY OF INVENTION

Technical Problem

In a light flux controlling member of a light-emitting device such as that disclosed in PTL 1, a protruding part used for setting the orientation with respect to the substrate is formed at the outer edge of the rear surface in some cases. In this case, a part of the light internally reflected by the emission surface is reflected by the rear surface, and then the light is emitted from the side surface of the protruding part. The light emitted from the side surface of the protruding part travels immediately upward of the light-emitting device, and consequently the quantity of the light travelling toward the proximity of the upper part of the light-emitting device is excessively increased, thus causing luminance unevenness.

An object of the present invention is to provide a light-emitting device that includes a light flux controlling member including a protruding part at an outer periphery part, and less causes luminance unevenness due to light emitted from the protruding part.

In addition, another object of the present invention is to provide a surface light source device and a display device including the light-emitting device.

Solution to Problem

A light-emitting device according to an embodiment of the present invention includes a light-emitting element and a light flux controlling member configured to control a distribution of light emitted from the light-emitting element. the light flux controlling member comprises an incidence surface that is an inner surface of a recess that opens to a rear side in such a manner as to intersect a central axis of the light flux controlling member, the incidence surface being configured to allow incidence of the light emitted from the light-emitting element; an emission surface disposed on a front side in such a manner as to intersect the central axis, the emission surface being configured to emit, to outside, light entered from the incidence surface; a rear surface extending radially outward from an opening edge of the recess; a protruding part disposed between the emission surface and the rear surface in a direction along the central axis, the protruding part protruding radially outward from an outer peripheral edge of the rear surface; and a scattering part disposed in a part of the rear surface, the scattering part being configured to scatter light reaching the scattering part. On a virtual plane including the central axis, an angle between two light beams emitted from the light-emitting device and having a maximum luminous intensity is 150° or greater. The scattering part is disposed in a region of the rear surface, the region being a region where light that is emitted from a center of a light-emitting surface of the light-emitting element and is then emitted from a side surface of the protruding part after being entered from the incidence surface and sequentially reflected by the emission surface and the rear surface reaches. On the virtual plane, in a case where light is applied from a central axis side to the scattering part at an incident angle of 60° such that the light is reflected, an average of a first angle between a first light beam and a second light beam and a second angle between the first light beam and a third light beam is 5° or greater, the first light beam being a light beam reflected by the scattering part and having a maximum light quantity, the second light beam being a light beam reflected by the scattering part at a reflection angle greater than that of the first light beam and having a light quantity of 50% of the maximum light quantity, the third light beam being a light beam reflected by the scattering part at a reflection angle smaller than that of the first light beam and having a light quantity of 50% of the maximum light quantity. On the virtual plane, in a case where light is applied from the central axis side to a first region of the rear surface at an incident angle of 60° such that the light is reflected, an average of a third angle between a fourth light beam and a fifth light beam and a fourth angle between the fourth light beam and a sixth light beam is 3° or greater, the fourth light beam being a light beam reflected by the first region and having a maximum light quantity, the fifth light beam being a light beam reflected by the first region at a reflection angle greater than that of the fourth light beam and having a light quantity of 50% of the maximum light quantity, the sixth light beam being a light beam reflected by the first region at a reflection angle smaller than that of the fourth light beam and having a light quantity of 50% of the maximum light quantity, the first region being a region that is closer to a center side than the scattering part and adjoins the scattering part in the rear surface.

A surface light source device according to an embodiment of the present invention includes the above-mentioned light-emitting device; and a light diffusion member configured to allow, to pass through the light diffusion member, light emitted from the light-emitting device while diffusing the light emitted from the light-emitting device.

A display device according to an embodiment of the present invention includes the above-mentioned surface light source device; and a display member configured to be illuminated with light emitted from the surface light source device.

Advantageous Effects of Invention

According to the present invention, unevenness of emission light is less caused even in the case where a protruding part is provided at the outer periphery part of the light flux controlling member.

BRIEF DESCRIPTION OF DRAWINGS

FIGS. 4A to 4D illustrate a configuration of a light flux controlling member in a light-emitting device according to Embodiment 1;

DESCRIPTION OF EMBODIMENTS

A light-emitting device, a surface light source device and a display device according to the present embodiment are described below with reference to the accompanying drawings. In the following description, a surface light source device suitable for a backlight of a liquid crystal display apparatus and the like is described as a typical example of the surface light source device according to the present embodiment.

Embodiment 1

Configurations of Surface Light Source Device and Light-emitting Device

Figure 1A:
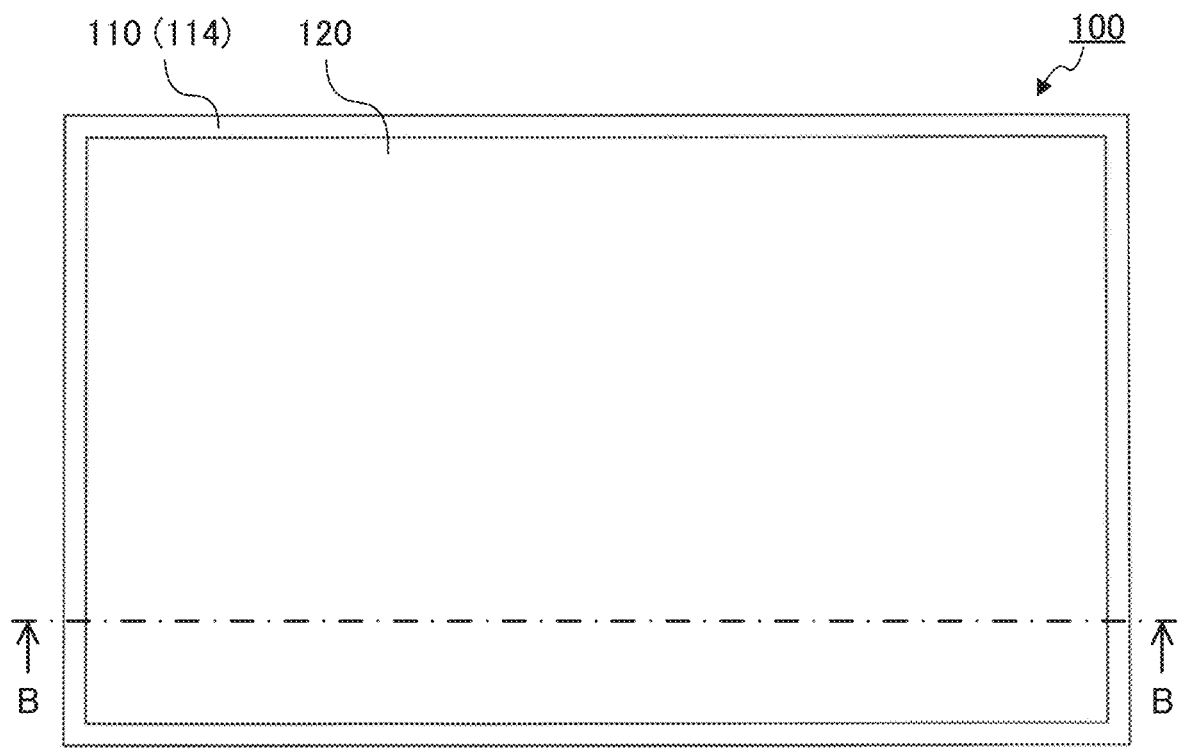
FIGS. 1A and 1B illustrate a configuration of a surface light source device according to Embodiment 1.
Figure 1B:
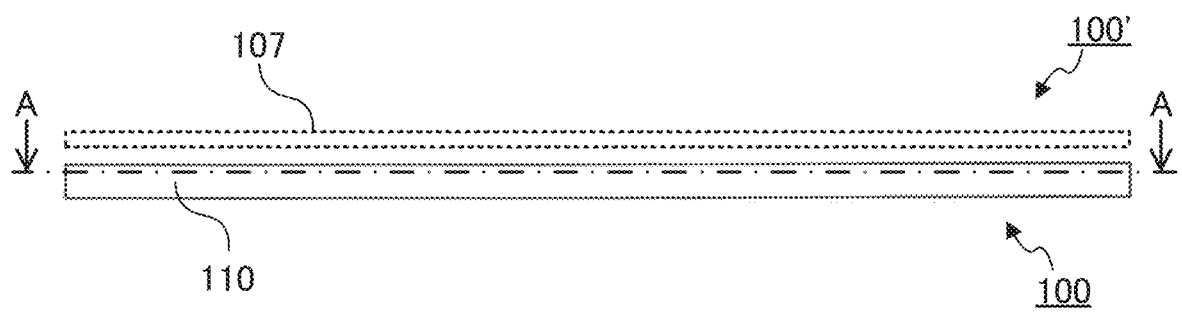
Figure 2A:
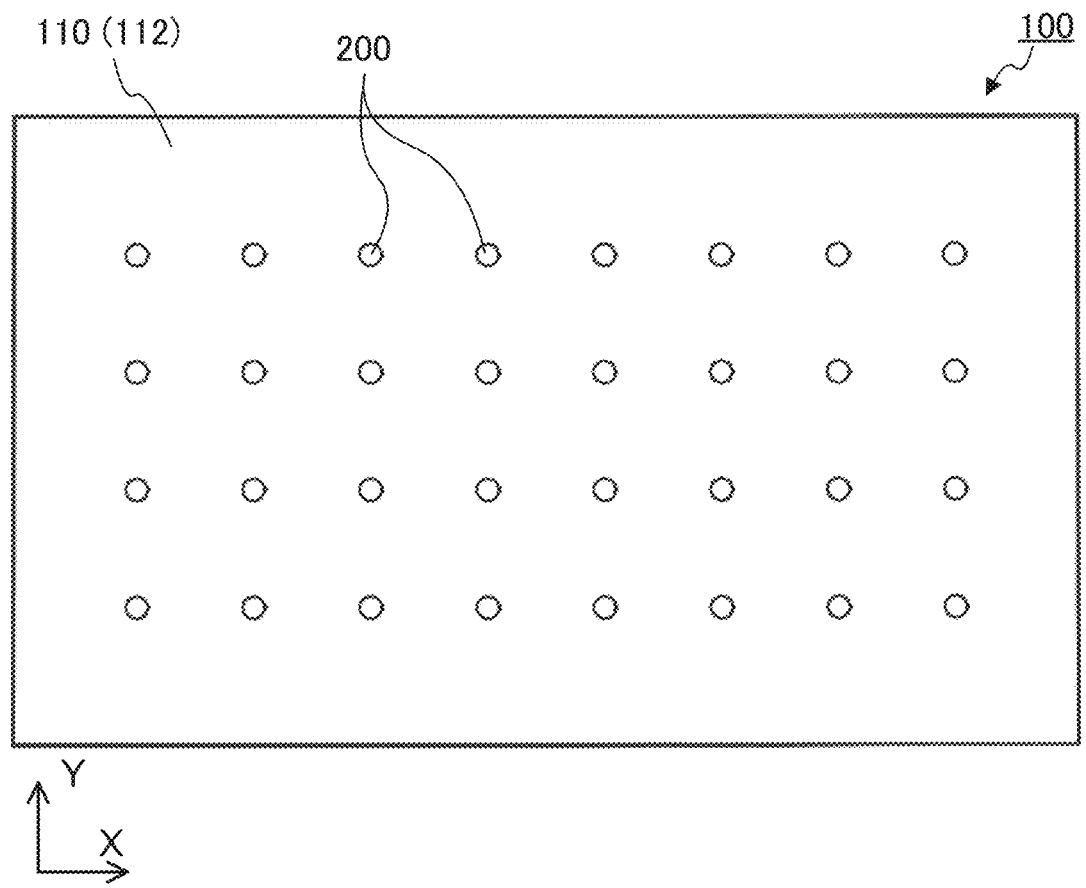
FIGS. 2A and 2B are sectional views illustrating a configuration of the surface light source device according to Embodiment 1.
Figure 2B:
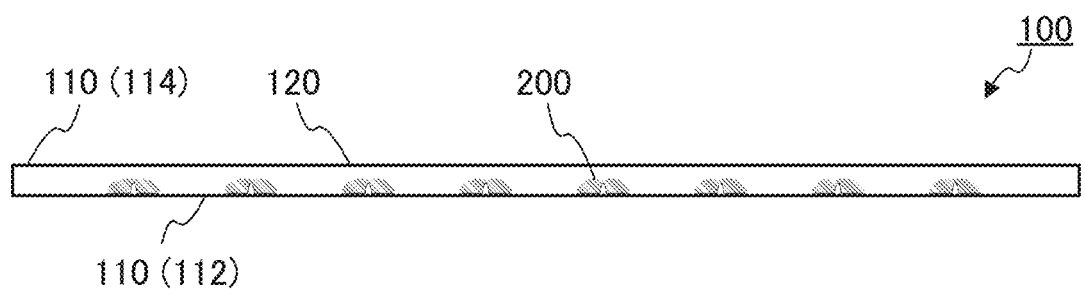
Figure 3:
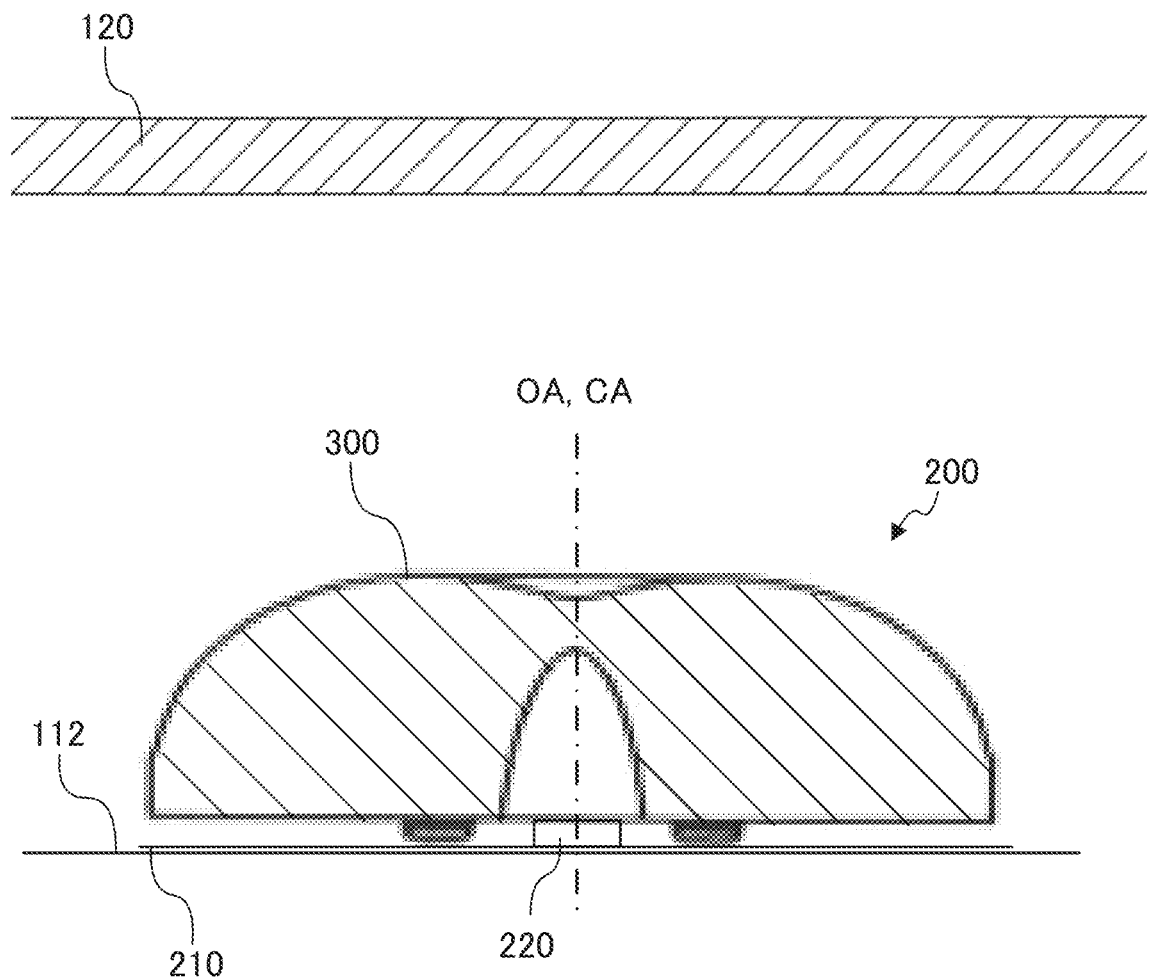
FIG. 3 is a partially enlarged sectional view of the surface light source device according to Embodiment 1.

FIGS. 1A to 3 illustrate a configuration of surface light source device 100 according to Embodiment 1. FIG. 1A is a plan view of surface light source device 100 according to Embodiment 1, and FIG. 1B is a front view of surface light source device 100. FIG. 2A is a sectional view taken along line A-A of FIG. 1B, and FIG. 2B is a sectional view taken along line B-B of FIG. 1A. FIG. 3 is a partially enlarged sectional view of surface light source device 100.

As illustrated in FIGS. 1A to 3, surface light source device 100 includes housing 110, a plurality of light-emitting devices 200, and light diffusion plate 120. Surface light source device 100 according to the present embodiment is applicable to a backlight of a liquid crystal display apparatus. In addition, as illustrated in FIG. 1B, surface light source device 100 can be used as display device 100' when combined with a display member (illumination target member) 107 (indicated by dotted line in FIG. 6B) such as a liquid crystal panel.

Light-emitting devices 200 are disposed in a matrix on bottom plate 112 of casing 110. The inner surface of bottom plate 112 functions as a diffusive reflection surface. In addition, top plate 114 of casing 110 is provided with an opening. Light diffusion plate 120 is disposed to cover the opening, and functions as a light-emitting surface. The light-emitting surface may have a size of, for example, approximately 400 mm×approximately 700 mm.

In the case where a plurality of light-emitting devices 200 are disposed in a matrix, the ratio of the center-to-center distance (pitch) of light-emitting devices 200 in a first direction (X direction illustrated in FIG. 2A) to the center-to-center distance (pitch) of light-emitting devices 200 in a second direction (Y direction illustrated in FIG. 2A) orthogonal to the first direction is approximately 1:1, for example.

Light-emitting devices 200 are respectively fixed to a plurality of substrates 210 disposed on bottom plate 112 of housing 110. As illustrated in FIG. 3, each light-emitting device 200 includes light-emitting element 220 and light flux controlling member 300. On a virtual plane including central axis CA, the angle between two light beams that are emitted from light-emitting device 200 and have the maximum luminous intensity is 150° or greater.

Substrate 210 is a plate-shaped member that supports light-emitting element 220 and light flux controlling member 300. Substrates 210 are disposed on bottom plate 112 at a predetermined interval.

Light-emitting element 220 is a light source of surface light source device 100, and is disposed on substrate 210. Light-emitting element 220 is a light-emitting diode (LED) such as a white light-emitting diode, for example. Light-emitting element 220 is disposed such that the center of the light-emitting surface is located on central axis CA of light flux controlling member 300 (see FIG. 3).

Light flux controlling member 300 is a diffusion lens that diffuses light emitted from light-emitting element 220, and is fixed to substrate 210. Light flux controlling member 300 controls the distribution of light emitted from light-emitting element 220 so as to expand the light travelling direction in the planar direction of substrate 210. Light flux controlling member 300 is disposed over light-emitting element 220 such that central axis CA thereof is aligned with optical axis OA of light-emitting element 220 (see FIG. 3). Note that "central axis CA of light flux controlling member 300" means a straight line passing through the rotation center of incidence surface 310 and/or emission surface 320. In addition, "optical axis OA of light-emitting element 220" means a central light beam of a stereoscopic emission light flux of light-emitting element 220. In the present embodiment, optical axis OA of light-emitting element 220 passes through the center of the light-emitting surface.

Light flux controlling member 300 can be formed by integral molding. The material of light flux controlling member 300 is not limited as long as light of a desired wavelength can pass therethrough. For example, the material of light flux controlling member 100 is an optically transparent resin such as polymethylmethacrylate (PMMA), polycarbonate (PC), epoxy resin (EP) and silicone resin, or glass. A main feature of surface light source device 100 according to the present embodiment is the configuration of light flux controlling member 300. Therefore, light flux controlling member 300 will be separately described later in detail.

Light diffusion plate 120 is a plate-shaped member having a light diffusing property, and allows the light emitted from light-emitting device 200 to pass therethrough while diffusing the light. Light diffusion plate 120 is disposed over light-emitting devices 200 with an air layer therebetween in such a manner that light diffusion plate 120 is approximately parallel to substrate 210. Normally, the size of light diffusion plate 120 is substantially the same as that of the illumination target member such as a liquid crystal panel. For example, light diffusion plate 120 is formed of an optically transparent resin such as polymethylmethacrylate (PMMA), polycarbonate (PC), polystyrene (PS), and styrene methyl methacrylate copolymerization resin (MS). In order to provide a light diffusing property, minute irregularities are formed in the surface of light diffusion plate 120, or diffusing members such as beads are dispersed in light diffusion plate 120.

In surface light source device 100 according to the embodiment of the present invention, the light emitted from each light-emitting element 220 is expanded by light flux controlling member 300 so as to illuminate a wide range of light diffusion plate 120. The light emitted from each light flux controlling member 300 is further diffused by light diffusion plate 120. Thus, surface light source device 100 according to the embodiment of the present invention can uniformly illuminate a planar illumination target member (e.g., a liquid crystal panel).

Configuration of Light Flux Controlling Member

FIGS. 4A to 4D illustrate a configuration of light flux controlling member 300 in light-emitting device 200 according to Embodiment 1. FIG. 4A is a plan view of light flux controlling member 300, FIG. 4B is a right side view of light flux controlling member 300, FIG. 4C is a bottom view of light flux controlling member 300, and FIG. 4D is a sectional view taken along line A-A of FIG. 4A.

As illustrated in FIGS. 4A to 4D, light flux controlling member 300 includes incidence surface 310, emission surface 320, rear surface 330, protruding part 340, and scattering part 350. Note that, in the present embodiment, light flux controlling member 300 includes flange part 360 configured for easy handling of light flux controlling member 300, and leg part 370 configured for positioning and fixing light flux controlling member 300 to substrate 210 and for defining a gap for dissipating heat generated by light-emitting element 220.

Incidence surface 310 is an inner surface of recess 305 that opens at the rear side in such a manner as to intersect central axis CA of light flux controlling member 300. Incidence surface 310 allows a large part of the light emitted from light-emitting element 220 to enter light flux controlling member 300, while controlling the travelling direction of the light. In the cross section including central axis CA, incidence surface 310 is formed such that incidence surface 310 comes closer to rear surface 330 with increasing distance from central axis CA. In the present embodiment, incidence surface 310 is rotationally symmetrical (circularly symmetrical) about central axis CA (optical axis OA) as the rotation center. Recess 305 is disposed in such a manner as to intersect optical axis OA (central axis CA of light flux controlling member 300) of light-emitting element 220.

Emission surface 320 is disposed so as to protrude from flange part 360 on the front side of light flux controlling member 300 (light diffusion plate 120 side). Emission surface 320 emits the light having entered light flux controlling member 300 to the outside while controlling the travelling direction of the light. Emission surface 320 is disposed in such a manner as to intersect central axis CA (optical axis OA). In the present embodiment, emission surface 320 is rotationally symmetrical (circularly symmetrical) about central axis CA (optical axis OA) as the rotation center. In addition, incidence surface 310 has a circular external shape in the cross-section perpendicular to central axis CA.

Emission surface 320 includes first emission surface 320a located in a predetermined range around central axis CA, second emission surface 320b continuously formed at the periphery of first emission surface 320a, and third emission surface 320c that connects second emission surface 320b and flange part 360 (see FIG. 4D). In the present embodiment, first emission surface 320a is a curved surface protruding rearward. Second emission surface 320b is a smooth curved surface protruding frontward and is located at the periphery of first emission surface 320a. Second emission surface 320b has an annular protruding shape. Third emission surface 320c is a curved surface located at the periphery of second emission surface 320b. In the cross section including central axis CA, the cross-section of third emission surface 320c may have a linear shape or a curved shape.

Rear surface 330 is located on the rear side of light flux controlling member 300 and extends radially outward from the opening edge of recess 305. Rear surface 330 has surface shapes that are different between the region closer to central axis CA and the region closer to the outer edge. In the region closer to the outer edge in rear surface 330, scattering part 350 that scatters reaching light having been internally reflected by emission surface 320 is disposed. In the region closer to central axis CA in rear surface 330, the rear surface has a shape that does not scatter reaching light.

Scattering part 350 is formed in a region where light that is emitted from the center of the light-emitting surface of light-emitting element 220, and is then emitted from the side surface of protruding part 340 after it is entered from incidence surface 310 and sequentially reflected by emission surface 320 and rear surface 330 reaches. The surface of scattering part 350 is formed in a randomized shape that scatters reaching light. Scattering part 350 has a half-value angle, which is measured by a method described later, of 5° or greater. The light distribution property achieved with the surface shape of scattering part 350 is described in detail later.

Figure 5A:
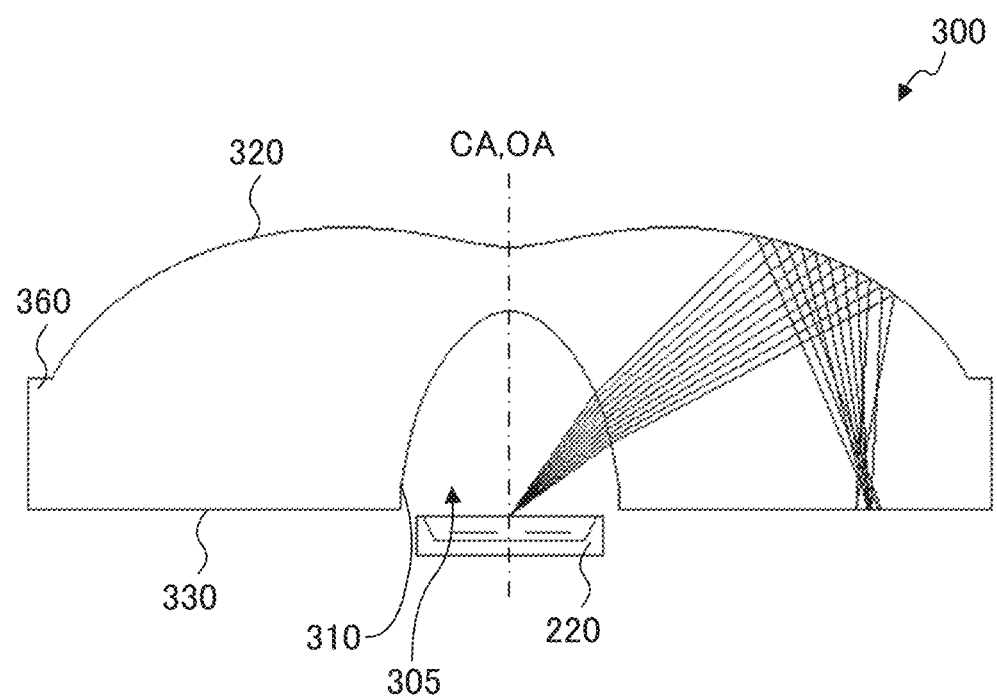
FIG. 5A is a part of a drawing illustrating light paths in the light-emitting device.
Figure 5B:
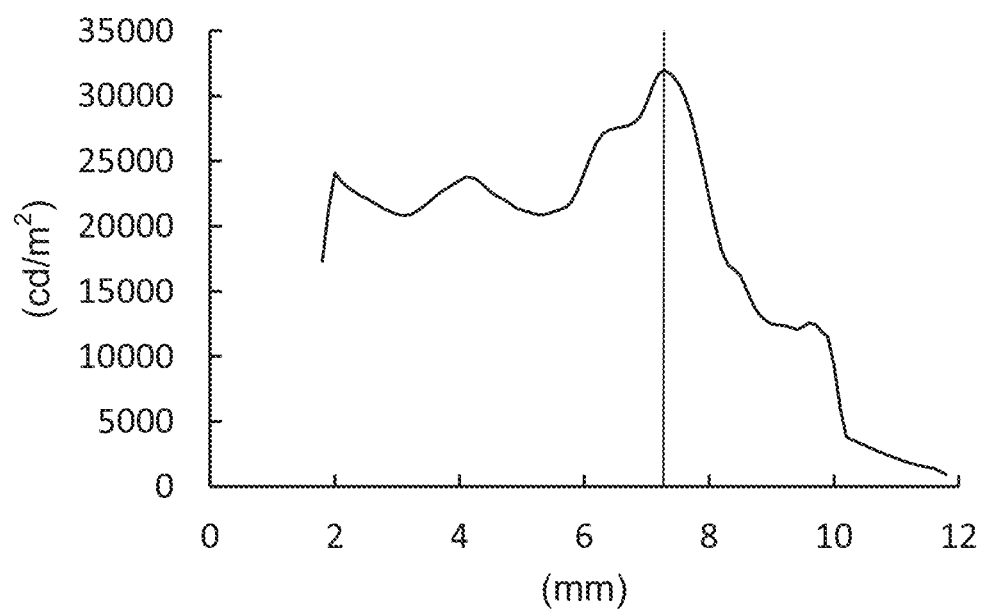
FIG. 5B illustrates a luminance distribution on a rear surface of light emitted from the light-emitting element and internally reflected by an emission surface.

Next, the region closer to central axis CA in rear surface 330 is described. FIG. 5A partially illustrates light paths of light emitted from the center of the light-emitting surface of light-emitting element 220 in a virtual plane including central axis CA, and FIG. 5B illustrates a luminance distribution, on rear surface 330, of light emitted from the center of the light-emitting surface of light-emitting element 220 and internally reflected by emission surface 320. In FIG. 5B, the abscissa indicates the distance from central axis CA (optical axis OA), and the ordinate indicates the luminance.

As illustrated in FIG. 5A, a part of the light emitted from the center of the light-emitting surface of light-emitting element 220 is internally reflected by emission surface 320 and is condensed at a particular region in rear surface 330. In addition, as illustrated in FIG. 5B, a large quantity of light also reaches the region that is closer to central axis CA in rear surface 330 than the region where the majority of light that is emitted from the center of the light-emitting surface of light-emitting element 220 and internally reflected by emission surface 320 reaches. Note that, the region illustrated in FIG. 5A where light internally reflected by emission surface 320 is collected at rear surface 330 is the region illustrated in FIG. 5B where the quantity of the light internally reflected by emission surface 320 is maximized. Although not illustrated in the drawings, it has been confirmed that if a shape like scattering part 350 is formed in the region closer to central axis CA in rear surface 330, luminance unevenness is caused on light diffusion plate 120. In view of this, in the present embodiment, the region closer to central axis CA side in rear surface 330 is formed in a shape that does not scatter the reaching light. The shape of the region closer to central axis CA side in rear surface 330 may be flat. The region adjoining scattering part 350 (the region closer to central axis CA of rear surface 330) closer to the center side than scattering part 350 in rear surface 330 has a half-value angle smaller than 3°. Details of the light distribution property achieved with the surface shape of the region adjoining scattering part 350 closer to the center side than scattering part 350 in rear surface 330 are described later.

In the direction along central axis CA, protruding part 340 is disposed between emission surface 320 and rear surface 330. In the present embodiment, protruding part 340 is disposed to protrude radially outward from the side surface (rear surface 330) of flange part 360. Protruding part 340 is used for orientation positioning in the case where substrate 210 is disposed to light flux controlling member 300, prevention of floating in the case where a reflection sheet or the like is disposed on substrate 210, a reference for product shape inspection, and the like. Any number of protruding parts 340 may be appropriately provided. In the present embodiment, three protruding parts 340 are disposed at an even interval in the circumferential direction. In addition, in the present embodiment, protruding part 340 has a half-columnar shape. The curvature of the side surface of protruding part 340 is smaller than the curvature of the outer edge of emission surface 320.

Simulation of Light Distribution Property of Light Flux Controlling Member

As described above, light flux controlling member 300 of light-emitting device 200 according to the present embodiment is a high diffusion lens that is highly light-diffusive. In view of this, the optical property of the diffusion lens used as light flux controlling member 300 is described. First, the optical properties of two light-emitting devices 200 having different diffusion properties were simulated. The present simulation was conducted in a cross-section that includes central axis CA, but does not include protruding part 340.

Figure 6A:
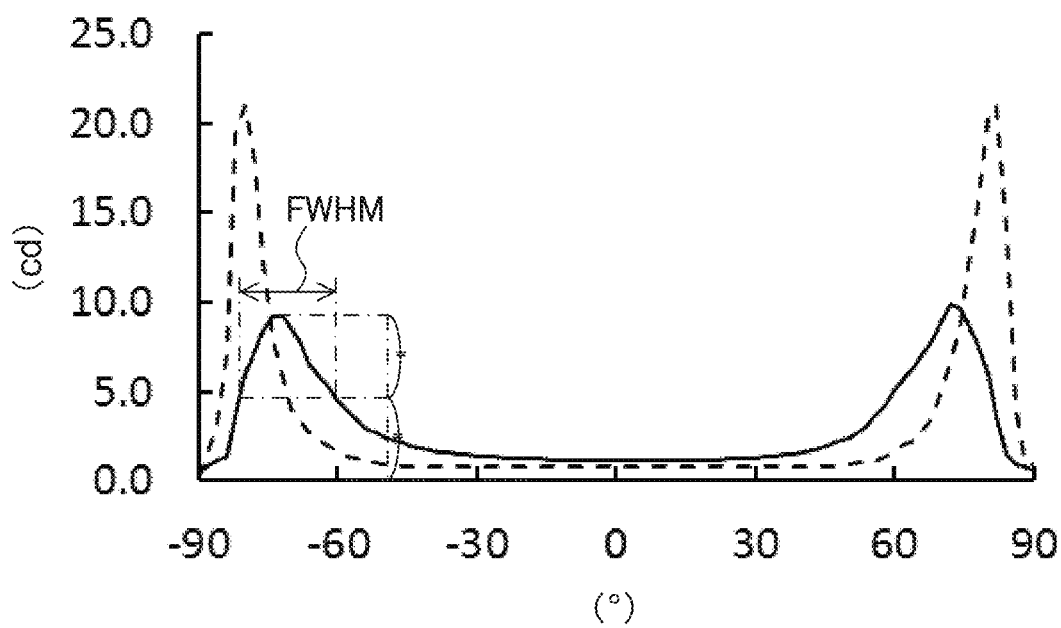
FIG. 6A is a graph illustrating a simulation result of a diffusion property of the light-emitting device.

FIG. 6A is a graph illustrating a simulation result of a diffusion property of light-emitting device 200 according to the present embodiment. In FIG. 6A, with respect to optical axis OA, the abscissa indicates angles of light emitted from emission surface 320 of light-emitting device 200 with respect to central axis CA. In addition, the ordinate in FIG. 6A indicates the luminous intensity (cd). In FIG. 6A, the solid line indicates results obtained with a low diffusion lens, and the broken line indicates results obtained with a high diffusion lens.

As indicated with the solid line and the broken line in FIG. 6A, it was confirmed that in the present embodiment, the angle between two light beams that are emitted from light-emitting device 200 and have the maximum luminous intensity is 150° or greater. When the angle is 150° or greater, the effect of scattering part 350 is remarkable. When the angle is 150° or greater, and the full width at half maximum (FWHM) is 15° or smaller, the effect of scattering part 350 is further remarkable. Here, as illustrated in FIG. 6, "the full width at half maximum" of two peaks in the graph of the relationship between the luminous intensity and the angle of optical axis OA of light emitted from light-emitting device 200 means an angle difference corresponding to a half luminous intensity of a maximum luminous intensity. In FIG. 6A, the FWHM (the average of the plus side and the minus side) of the low diffusion lens indicated with the solid line is approximately 20°, and the FWHM of the high diffusion lens indicated with the broken line is approximately 10°. That is, the effect of scattering part 350 is significant in a high diffusion lens. While FIG. 6A illustrates the FWHM of the minus side light distribution angle of a low diffusion lens, the FWHM can be determined in a similar manner also for the plus side light distribution angle of a low diffusion lens, the plus side and the minus side of a high diffusion lens. With such a high diffusion lens, the quantity of light travelling immediately upward is reduced and the luminance in a region around the upper part of light-emitting device 200 is reduced. Therefore, such a high diffusion lens is a high-performance light flux controlling member 300 that provides a high diffusion property and has a function of suppressing the luminance unevenness due to protruding part 340 although bright spots generated by light travelling immediately upward from the side surface of protruding part 360 are noticeable.

Figure 6B:
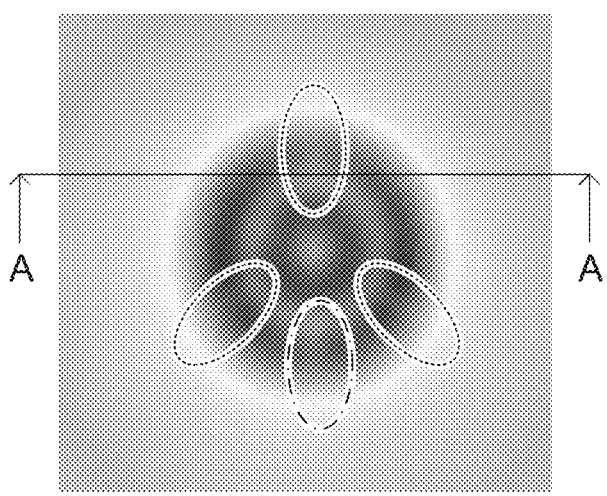
FIG. 6B illustrates a luminance distribution on the light diffusion plate of a light-emitting device according to a comparative example.

Next, the luminance distribution on light diffusion plate 120 was simulated. FIG. 6B illustrates a simulation result of a luminance distribution of a light-emitting device according to a comparative example. In FIG. 6B, protruding part 340 is disposed in the region surrounded by the dotted line. In addition, a gate is disposed in the portion surrounded by the dashed line in FIG. 6B.

As illustrated in the region surrounded by the dotted line in FIG. 6B, luminance unevenness was caused in a portion corresponding to the position where protruding part 340 is disposed. Note that, as the dashed line indicates in FIG. 6B, luminance unevenness was caused also at a position corresponding to the position where the gate is disposed.

Figure 7A:
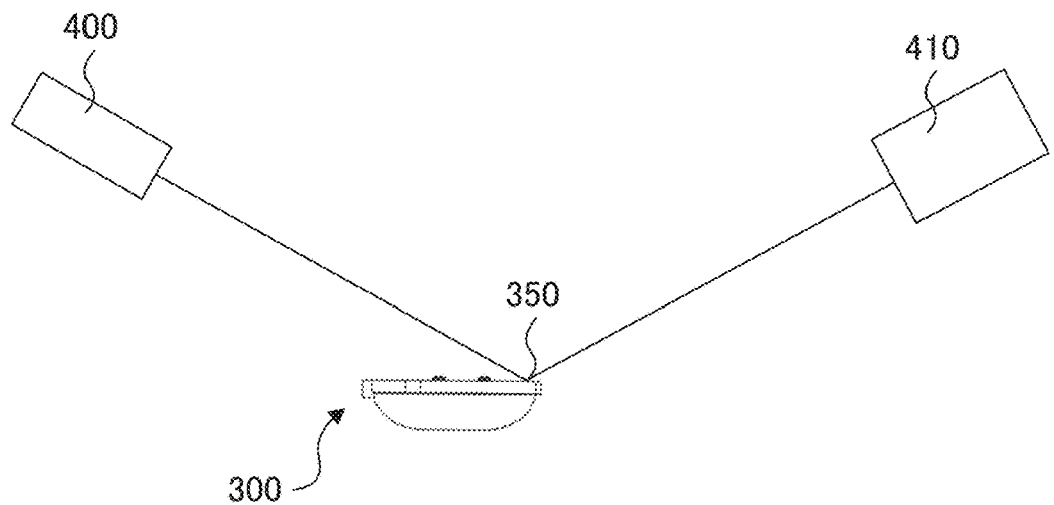
FIGS. 7A to 7C illustrate a method of measuring a half-value angle.
Figure 7B:
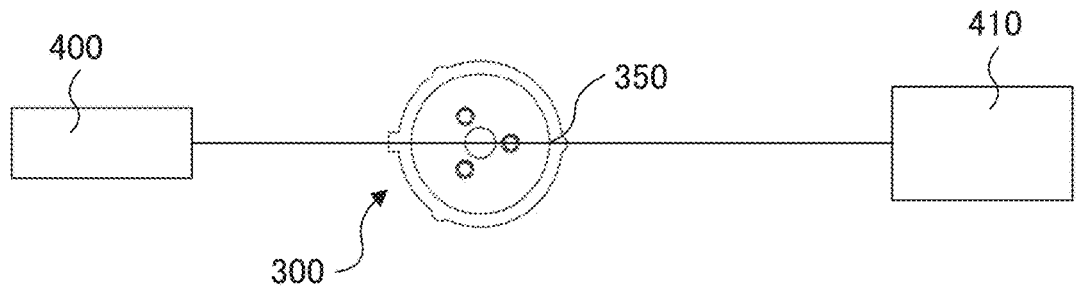
Figure 7C:
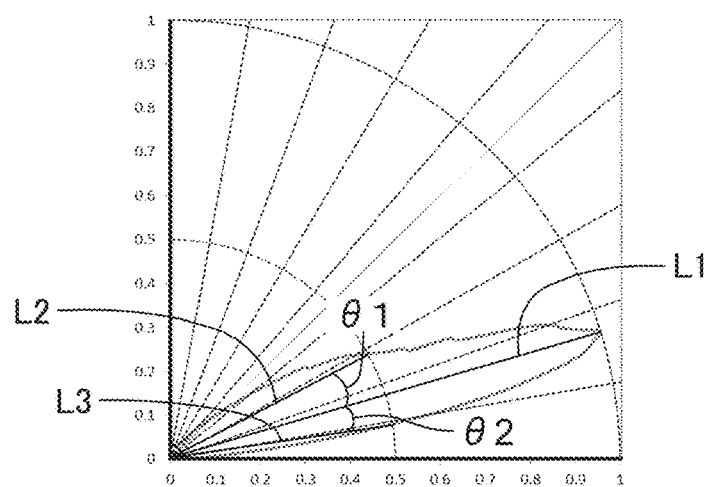

Next, luminance variation at the position corresponding to protruding part 340 on light diffusion plate 120 was simulated in the relationship with the shape (roughness) of scattering part 350. The half-value angle was used as a parameter representing the roughness of rear surface 330 (scattering part 350 and the region closer to central axis CA of rear surface 330). First, the half-value angle serving as the parameter representing of the roughness of the rear surface is described. FIGS. 7A and 7B illustrate a method of measuring the half-value angle. FIG. 7A is a schematic view illustrating a measuring state of the half-value angle as viewed from the lateral side, and FIG. 7B is a schematic view illustrating a measuring state of the half-value angle as viewed from above. FIG. 7C is a graph illustrating measurement results of reflection light using light receptor 410.

As illustrated in FIGS. 7A and 7B, first, light flux controlling member 300 is fixed such that rear surface 330 is horizontally disposed. The method of fixing light flux controlling member 300 may be appropriately selected. Light from light source (white LED light source having an illumination spot diameter of 4 to 5 mm and a wavelength of 550 nm) 400 is emitted to rear surface 330 (here, scattering part 350) at an incident angle of 60° from central axis CA side such that the light is reflected. Note that, while the planar dimension of scattering part 350 to which the light is applied depends on the size of light flux controlling member 300, at least a circular region having a diameter of 2 mm is required as the planar dimension. In the case where the planar dimension of scattering part 350 to which the light is applied cannot be ensured and light from light source 400 is applied also to other regions, the other regions are required to be masked or colored with black.

Next, light reflected by scattering part 350 is measured with goniophotometer GP-4 (Nikka Densok Limited) 410 incorporated in a light receptor (Photomultiplier (R928). At this time, to receive light scattered by scattering part 350 in various angles with light receptor 410 on a virtual plane described later, scanning is performed around the illuminated scattering part 350 at the center.

Next, the half-value angle is determined based on the results of the measurement using light receptor 410. As illustrated in FIG. 7C, on a virtual plane including central axis CA, a light beam having a maximum quantity is set as first light beam L1, a light beam having a light quantity of 50% of the maximum light quantity and having a reflection angle greater than that of first light beam L1 is set as second light beam L2, and a light beam having a light quantity of 50% of the maximum light quantity and having a reflection angle smaller than that of first light beam L1 is set as third light beam L3. In addition, the angle between first light beam L1 and second light beam L2 is set as first angle θ1, and the angle between first light beam L1 and third light beam L3 is set as second angle θ2. The average angle between first angle θ1 and second angle θ2 is set as the half-value angle.

Note that, in light flux controlling member 300, a part of light entered from incidence surface 310 and internally reflected by emission surface 320 so as to reach rear surface 330 is internally reflected by rear surface 330 (scattering part 350), and then emitted from the side surface of protruding part 340. However, in the above-described measurement of the half-value angle, light is applied to scattering part 350 of rear surface 330 from the outside. The reason for this is that scattering of the inner reflection and scattering of the outer reflection are substantially the same in scattering part 350, and that the outer reflection is easier to measure, and therefore, the outer reflection is used in the measurement of the half-value angle.

Next, the luminance on line A-A of FIG. 6B was measured. The luminance was examined with eight light-emitting devices differing in the half-value angle θ(θ=0°, 2.1°, 3.0°, 3.9°, 4.8°, 6.7°, 10.6° and 29.5° of scattering part 350.

Figure 8A:
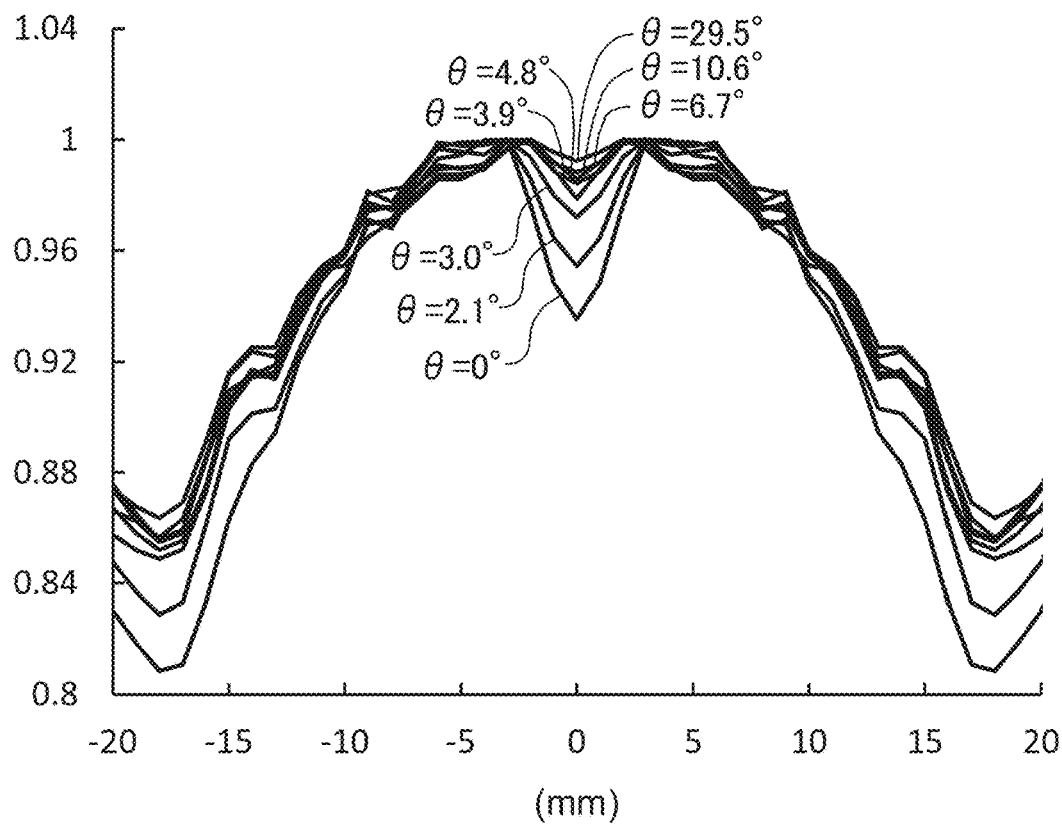
FIGS. 8A and 8B are graphs illustrating a relationship between a luminance and a half-value angle.
Figure 8B:
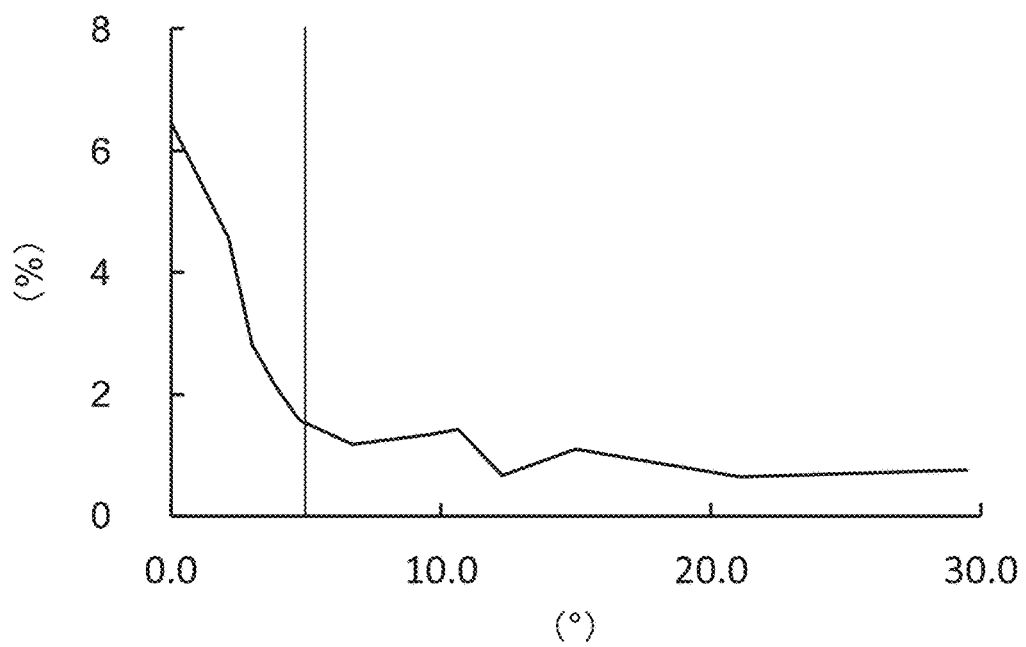

The luminance was determined as a relative value with respect to "1" set as the maximum luminance on line A-A of FIG. 6B. In addition, the relationship between the half-value angle of scattering part 350 and the difference (luminance difference) between the maximum luminance and the luminance at the position corresponding to protruding part 340 was examined. FIG. 8A is a graph illustrating a simulation result of the luminance. In FIG. 8A, the abscissa indicates a distance from a position corresponding to the center on line A-A, and the ordinate indicates a relative value of the luminance. FIG. 8B is a graph illustrating a relationship between the half-value angle and the luminance difference. In FIG. 8B, the abscissa indicates the half-value angle, and the ordinate indicates the luminance difference at a position corresponding to the center on line A-A with respect to the maximum luminance.

As illustrated in FIGS. 8A and 8B, the greater the half-value angle, the smaller the luminance difference. That is, the higher the diffusion property, the smaller the luminance unevenness. In the present embodiment, when the half-value angle is 5° or greater, almost no luminance unevenness is caused. In view of this, in the present embodiment, the half-value angle of 5° or greater in measurement by the above-described method was set as a condition of scattering part 350. Note that, although the results are not presented here, the luminance unevenness corresponding to the position where the gate is disposed was also eliminated by disposing scattering part 350 having a half-value angle of 5° or greater.

The half-value angle as a display reference of the region adjoining scattering part 350 in rear surface 330 on the side closer to the center side than scattering part 350 can be determined in the same manner as the half-value angle of scattering part 350. Although not illustrated in the drawings, in the cross section including central axis CA, a light beam having a maximum light quantity is set as a fourth light beam, a light beam having a light quantity of 50% of the maximum light quantity and having a reflection angle greater than that of the fourth light beam is set as fifth light beam, and a light beam having a light quantity of 50% of the maximum light quantity and having a reflection angle smaller than that of the fourth light beam is set as a fourth light beam. In addition, the angle between the fourth light beam and the fifth light beam is set as a third angle, and the angle between the fourth light beam and the sixth light beam is set as a fourth angle. The average angle between the third angle and the fourth angle is set as a half-value angle. On a virtual plane including central axis CA, the half-value angle smaller than 3° is obtained in a rear surface region radially inside the point where the quantity of light that is emitted from the center of the light-emitting surface of light-emitting element 220 and reaches rear surface 330 after being entered from incidence surface 310 and reflected by emission surface 320 is maximized. In the case where the angle is 3° or greater, the light reaching the region is scattered, and luminance unevenness may be caused on light diffusion plate 120. Note that, also in this case, since the degree of scattering of the inner reflection to rear surface 330 and the outer reflection to rear surface 330 are substantially the same, the outer reflection was used in the measurement of the half-value angle.

Light Paths in Light-emitting Device

Figure 9A:
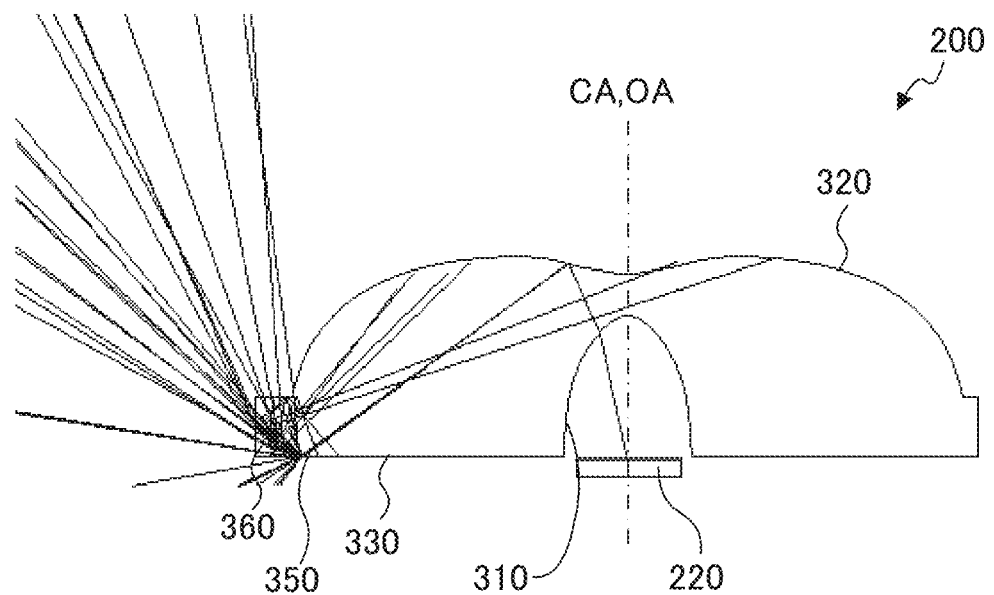
FIGS. 9A and 9B illustrate light paths in the light-emitting device according to Embodiment 1 and the light-emitting device according to the comparative example.
Figure 9B:
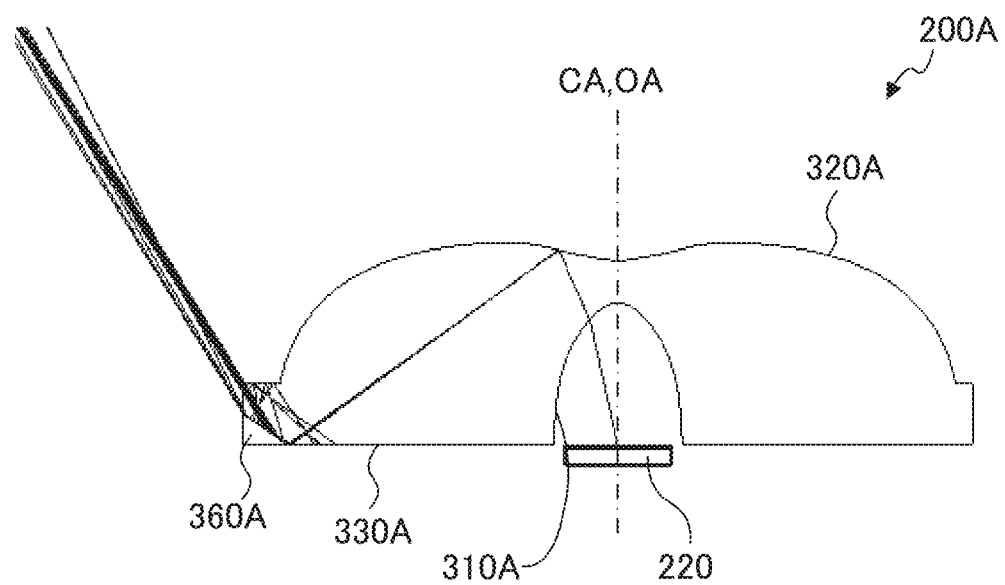

Next, exemplary light paths in light-emitting device 200 according to the present embodiment and light-emitting device 200A according to comparative example 1 are described. FIG. 9A illustrates exemplary light paths in light-emitting device 200 according to the present embodiment, and FIG. 9B illustrates exemplary light paths in light-emitting device 200A according to comparative example 1. Light-emitting device 200A according to comparative example 1 differs from light-emitting device 200 according to Embodiment 1 only in that scattering part 350 is not provided in rear surface 330A. FIGS. 9A and 9B illustrate light paths in a cross section including central axis CA and protruding part 340. Note that hatching is omitted in FIGS. 9A and 9B to illustrate light paths.

As illustrated in FIG. 9A, in light-emitting device 200 according to the present embodiment, some of the light beams emitted from light-emitting element 220 are entered from incidence surface 310 and internally reflected by emission surface 320. Some of the light beams internally reflected by emission surface 320 are again internally reflected by scattering part 350. At this time, the light beams are reflected by scattering part 350 such that the half-value angle is 5° or greater, and therefore the light beams reflected by scattering part 350 are expanded to travel in various directions. Then, the light beams travelling in various directions are emitted in various directions from a plurality of portions of light flux controlling member 300.

In light-emitting device 200A according to comparative example 1, on the other hand, some of the light beams emitted from light-emitting element 220 are entered from incidence surface 310A and internally reflected by emission surface 320A as illustrated in FIG. 9B. Some of the light beams internally reflected by emission surface 320A are again internally reflected by rear surface 330A. At this time, light reaching rear surface 330 is reflected with almost no scattering. The light regularly reflected by rear surface 330A advances immediately upward from the side surface of flange part 360A.

Effect

As described above, the light-emitting device according to the present embodiment includes scattering part 350, and therefore light beams are emitted in various directions from various portions of light flux controlling member 300. Thus, luminance unevenness less occurs.

Embodiment 2

A light-emitting device according to Embodiment 2 differs from light-emitting device 200 according to Embodiment 1 only in structure of light flux controlling member 500. In view of this, in the present embodiment, light flux controlling member 500 is mainly described. Note that the components same as those of light-emitting device 200 according to Embodiment 1 are designated with the same reference numerals and the description thereof will be omitted.

Configuration of Light Flux Controlling Member

Figure 10A:
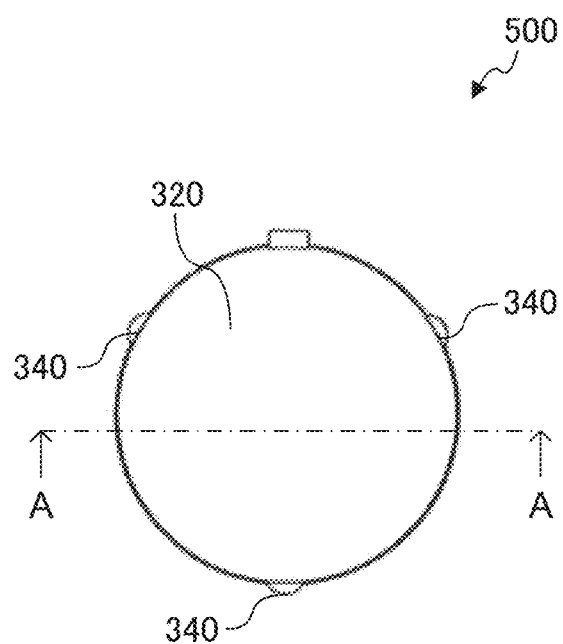
FIGS. 10A to 10D illustrate a configuration of a light flux controlling member in a light-emitting device according to Embodiment 2.
Figure 10B:
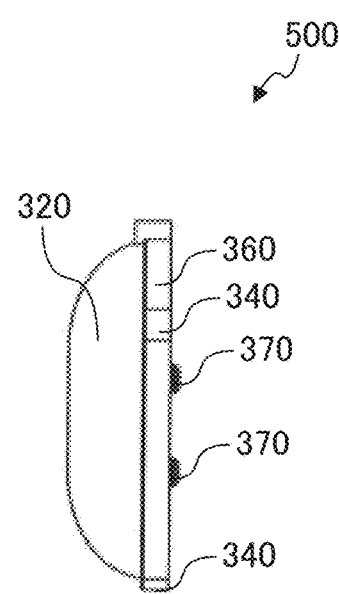
Figure 10C:
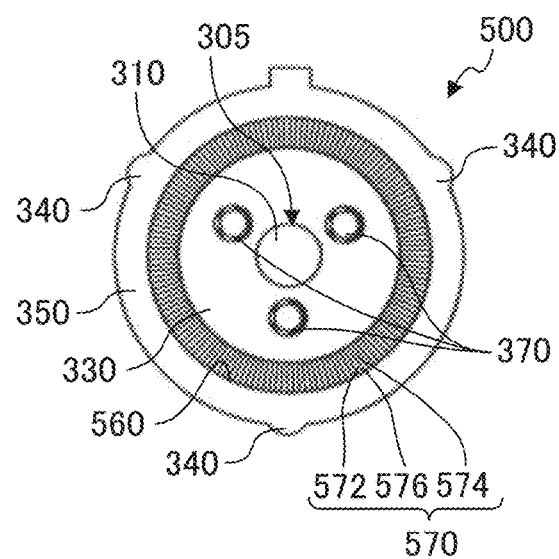
Figure 10D:
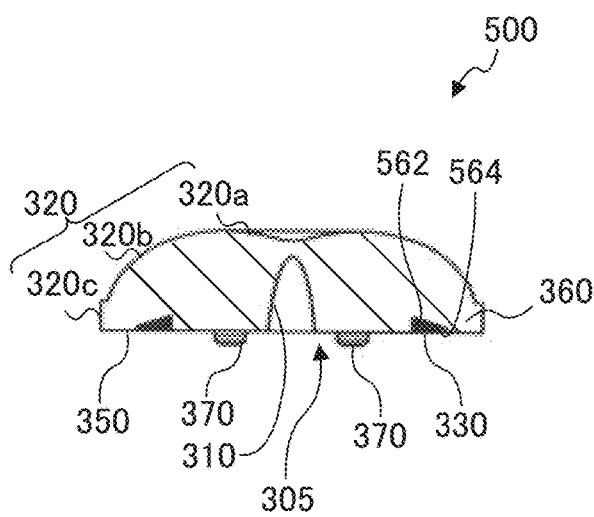

FIGS. 10A to 10D illustrate a configuration of light flux controlling member 500 in the light-emitting device according to Embodiment 2. FIG. 10A is a plan view of light flux controlling member 500, FIG. 10B is a right side view of light flux controlling member 500, FIG. 10C is a bottom view of light flux controlling member 500, and FIG. 10D is a sectional view taken along line A-A of FIG. 10A.

As illustrated in FIGS. 10A to 10D, light flux controlling member 500 includes annular groove 560, in addition to incidence surface 310, emission surface 320, rear surface 330, protruding part 340, and scattering part 350. Note that, also in the present embodiment, light flux controlling member 500 includes flange part 360 and leg part 370.

Annular groove 560 is formed in rear surface 330 in such a manner as to surround the opening edge of recess 305 (incidence surface 310). Preferably, annular groove 560 is disposed in a region where the majority of light totally reflected by emission surface 320 reaches. Annular groove 560 is rotationally symmetrical about central axis CA.

Annular groove 560 includes first inner surface 562 disposed on the side closer to central axis CA side, and second inner surface 564 farther from central axis CA than first inner surface 562. In addition, in the present embodiment, a plurality of linear ridges 570 are disposed on second inner surface 564 side, and the surfaces of linear ridges 570 are second inner surface 564.

First inner surface 562 may be disposed in parallel to central axis CA, or may be tilted such that first inner surface 562 comes closer to the front side with increasing distance from central axis CA. In the present embodiment, first inner surface 562 is parallel to central axis CA.

Second inner surface 564 is formed on the rear side of light flux controlling member 300 in such a manner as to surround first inner surface 562. Second inner surface 564 is tilted such that second inner surface 564 comes closer to the rear side with increasing distance from central axis CA.

Linear ridge 570 reflects light internally reflected by emission surface 320. Each linear ridge 570 includes first inclined surface 572, second inclined surface 574, and ridgeline 576 disposed between first inclined surface 572 and second inclined surface 574. Examples of the cross-sectional shape of linear ridge 570 in a direction perpendicular to ridgeline 576 include a triangular shape, a triangular shape with a chamfered apex, a semicircular shape, a trapezoidal shape with a surface between first inclined surface 572 and second inclined surface 574, and the like. In the present embodiment, the cross-sectional shape of linear ridge 570 in a direction perpendicular to ridgeline 576 is a triangular shape. That is, in the present embodiment, first inclined surface 572 and second inclined surface 574 are connected by ridgeline 576. The plurality of linear ridges 570 are disposed such that they are rotationally symmetrical (n-fold rotational symmetrical; n=the number of linear ridges 570) about central axis CA. Each linear ridge 570 functions as a total reflection prism. Specifically, a second light beam totally reflected by emission surface 320 is sequentially reflected by first inclined surface 572 and second inclined surface 574 toward the lateral direction of the light-emitting device.

Light Paths in Light-emitting Device

Figure 11A:
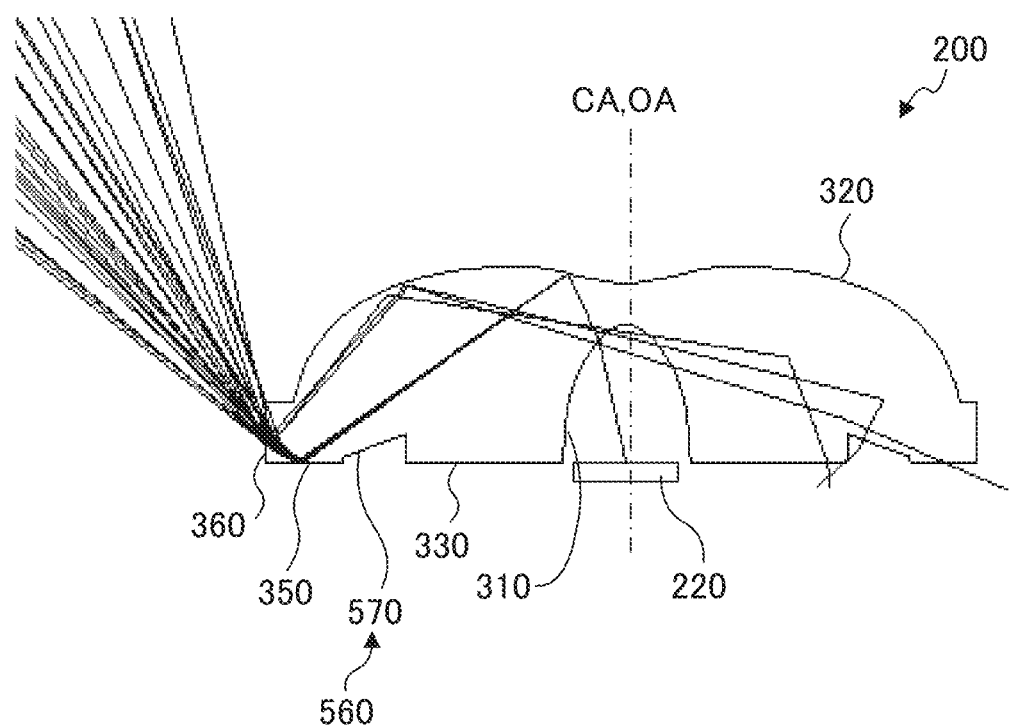
FIGS. 11A and 11B illustrate light paths in the light-emitting device according to Embodiment 2 and the light-emitting device according to the comparative example.
Figure 11B:
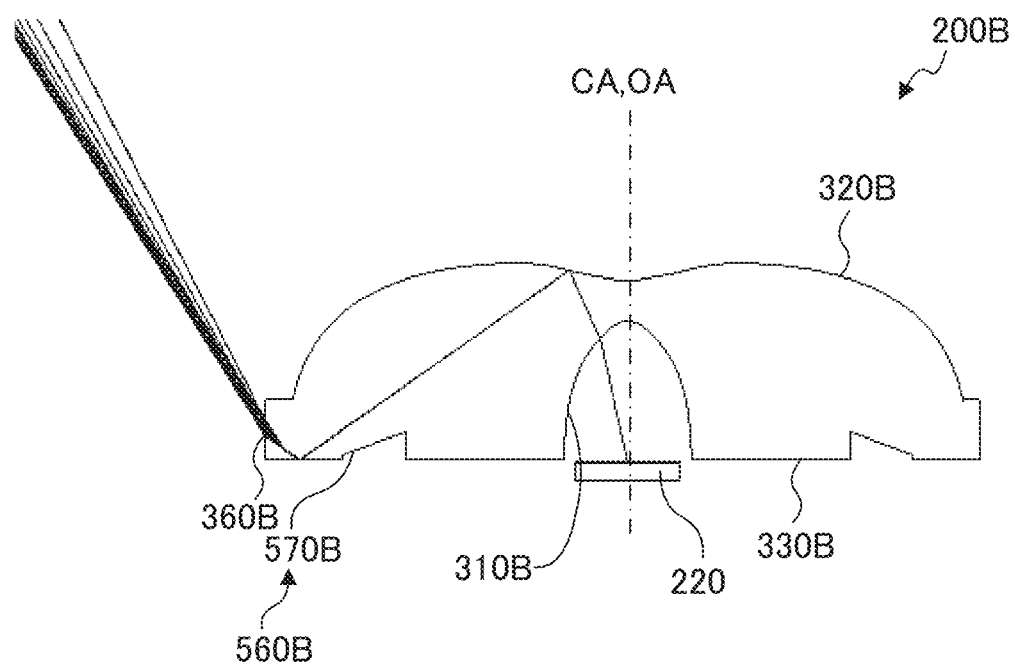

Next, exemplary light paths in a light-emitting device according to the present embodiment and a light-emitting device according to comparative example 2 are described. FIG. 11A illustrates exemplary light paths in the light-emitting device according to the present embodiment, and FIG. 11B illustrates exemplary light paths in the light-emitting device according to comparative example 2. The light-emitting device according to comparative example 2 differs from the light-emitting device according to Embodiment 2 only in that scattering part 350 is not provided in rear surface 330. FIGS. 11A and 11B illustrate light paths in the cross section including central axis CA and scattering part 350. Note that hatching is omitted in FIGS. 11A and 11B to illustrate light paths.

As illustrated in FIG. 11A, in the light-emitting device according to the present embodiment, some of the light beams emitted from light-emitting element 220 are entered from incidence surface 310 and internally reflected by emission surface 320. Some of the light beams internally reflected by emission surface 320 again internally reflected by scattering part 350. At this time, the light is reflected by scattering part 350 such that the half-value angle is 5° or greater, and therefore the light reflected by scattering part 350 travels in an expanding manner. In addition, although not illustrated in the drawings, some of the light beams emitted light-emitting element 220 are entered from incidence surface 310 and internally reflected by emission surface 320. Some of the light beams internally reflected by emission surface 320 reach linear ridge 570. Then, the light reaching linear ridge 570 is laterally reflected. The scattering level of linear ridge 570 is lower than that of scattering part 350.

As illustrated in FIG. 11B, in light-emitting device 200B according to comparative example 2, on the other hand, some of the light beams emitted from light-emitting element 220 are entered from incidence surface 310B and internally reflected by emission surface 320B. Some of the light beams internally reflected by emission surface 320B again internally reflected by rear surface 330B. At this time, the light reaching rear surface 330B is regularly reflected. The light regularly reflected by rear surface 330B travels immediately upward from the side surface of flange part 360B. In addition, although not illustrated in the drawing, some of the light beams internally reflected by emission surface 320B reach annular groove 560B (linear ridge 570B). The light reaching linear ridge 570B is sequentially reflected by the first inclined surface (second inclined surface) and the second inclined surface (first inclined surface) toward the lateral direction of the light-emitting device.

Effect

As described above, in the light-emitting device according to the present embodiment, a part of the light internally reflected by emission surface 320 is emitted by linear ridge 570 toward the lateral direction of the light-emitting device as in Embodiment 1. Thus, high diffusion property is achieved and luminance unevenness is further reduced by the effect of scattering part 350.

This application is entitled to and claims the benefit of Japanese Patent Application No. 2017-171496 filed on Sep. 6, 2017, the disclosure each of which including the specification, drawings and abstract is incorporated herein by reference in its entirety.

INDUSTRIAL APPLICABILITY

The light-emitting device and the surface light source device of the embodiments of the present invention are applicable to a backlight of a liquid crystal display apparatus, a generally-used illumination apparatuses, and the like, for example.

REFERENCE SIGNS LIST

100 Surface light source device
110 Housing
112 Bottom plate
114 Top plate
120 Light diffusion plate
200, 200A, 200B Light-emitting device
210 Substrate
220 Light-emitting element
300, 500 Light flux controlling member
305 Recess
310, 310A, 310B Incidence surface
320, 320A, 320B Emission surface
320a First emission surface
320b Second emission surface
320c Third emission surface
330, 330A, 330B Rear surface
340 Protruding part
350 Scattering part
360, 360A, 360B Flange part
370 Leg part
560, 560B Annular groove
562 First inner surface
564 Second inner surface
570, 570B Linear ridge
572 First inclined surface
574 Second inclined surface
576 Ridgeline
CA Central axis of light flux controlling member
OA Optical axis of light-emitting element

What is claimed is:

1. A light-emitting device including a light-emitting element and a light flux controlling member configured to control a distribution of light emitted from the light-emitting element,
wherein the light flux controlling member comprises
an incidence surface that is an inner surface of a recess that opens to a rear side in such a manner as to intersect a central axis of the light flux controlling member, the incidence surface being configured to allow incidence of the light emitted from the light-emitting element;
an emission surface disposed on a front side in such a manner as to intersect the central axis, the emission surface being configured to emit, to outside, light entered from the incidence surface;
a rear surface extending radially outward from an opening edge of the recess;
a protruding part disposed between the emission surface and the rear surface in a direction along the central axis, the protruding part protruding radially outward from an outer peripheral edge of the rear surface; and
a scattering part disposed in a part of the rear surface, the scattering part being configured to scatter light reaching the scattering part,
wherein on a virtual plane including the central axis, an angle between two light beams emitted from the light-emitting device and having a maximum luminous intensity is 150° or greater,
wherein the scattering part is disposed in a region of the rear surface, the region being a region where light that is emitted from a center of a light-emitting surface of the light-emitting element and is then emitted from a side surface of the protruding part after being entered from the incidence surface and sequentially reflected by the emission surface and the rear surface reaches,
wherein, on the virtual plane, in a case where light is applied from a central axis side to the scattering part at an incident angle of 60° such that the light is reflected, an average of a first angle between a first light beam and a second light beam and a second angle between the first light beam and a third light beam is 5° or greater, the first light beam being a light beam reflected by the scattering part and having a maximum light quantity, the second light beam being a light beam reflected by the scattering part at a reflection angle greater than that of the first light beam and having a light quantity of 50% of the maximum light quantity, the third light beam being a light beam reflected by the scattering part at a reflection angle smaller than that of the first light beam and having a light quantity of 50% of the maximum light quantity, and wherein, on the virtual plane, in a case where light is applied from the central axis side to a first region of the rear surface at an incident angle of 60° such that the light is reflected, an average of a third angle between a fourth light beam and a fifth light beam and a fourth angle between the fourth light beam and a sixth light beam is 3° or greater, the fourth light beam being a light beam reflected by the first region and having a maximum light quantity, the fifth light beam being a light beam reflected by the first region at a reflection angle greater than that of the fourth light beam and having a light quantity of 50% of the maximum light quantity, the sixth light beam being a light beam reflected by the first region at a reflection angle smaller than that of the fourth light beam and having a light quantity of 50% of the maximum light quantity, the first region being a region that is closer to a center side than the scattering part and adjoins the scattering part in the rear surface.

2. The light-emitting device according to claim 1, further comprising an annular groove having a circular shape formed in the rear surface, the annular groove being formed in a region closer to the central axis than the scattering part in such a manner as to surround the opening edge of the recess, the annular groove including a first inner surface and a second inner surface, the first inner surface being closer to the central axis than the second inner surface, the second inner surface being farther from the central axis than the first inner surface, wherein a plurality of linear ridges are disposed in the second inner surface, each of the plurality of linear ridges including a first inclined surface, a second inclined surface, and a ridgeline disposed between the first inclined surface and the second inclined surface, each of the plurality of linear ridges being tilted such that the plurality of linear ridges come closer to the rear side with increasing distance from the central axis.

3. The light-emitting device according to claim 1, wherein a full width at half maximum of each of two peaks in a graph of a relationship between a luminous intensity and an angle of light emitted from the light-emitting device with respect to the optical axis on the virtual plane is 15° or smaller.

4. A surface light source device comprising:
the light-emitting device according to claim 1; and
a light diffusion member configured to allow, to pass through the light diffusion member, light emitted from the light-emitting device while diffusing the light emitted from the light-emitting device.

5. A display device comprising:
the surface light source device according to claim 4; and
a display member configured to be illuminated with light emitted from the surface light source device.

6. A surface light source device comprising:
the light-emitting device according to claim 2; and
a light diffusion member configured to allow, to pass through the light diffusion member, light emitted from the light-emitting device while diffusing the light emitted from the light-emitting device.

7. A surface light source device comprising:
the light-emitting device according to claim 3; and
a light diffusion member configured to allow, to pass through the light diffusion member, light emitted from the light-emitting device while diffusing the light emitted from the light-emitting device.

8. A display device comprising:
the surface light source device according to claim 1; and
a display member configured to be illuminated with light emitted from the surface light source device.

9. A display device comprising:
the surface light source device according to claim 2; and
a display member configured to be illuminated with light emitted from the surface light source device.

10. A display device comprising:
the surface light source device according to claim 3; and
a display member configured to be illuminated with light emitted from the surface light source device.

11. A display device comprising:
the surface light source device according to claim 6; and
a display member configured to be illuminated with light emitted from the surface light source device.

12. A display device comprising:
the surface light source device according to claim 7; and
a display member configured to be illuminated with light emitted from the surface light source device.

* * * * *